United States Patent
Chou et al.

(10) Patent No.: US 9,851,560 B2
(45) Date of Patent: Dec. 26, 2017

(54) OPTICAL DEVICE AND PROJECTION APPARATUS

(71) Applicant: Industrial Technology Research Institute, Hsinchu (TW)

(72) Inventors: Ming-Chieh Chou, Kaohsiung (TW); Chi-Hung Lee, Hsinchu County (TW); Yi-Cheng Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 139 days.

(21) Appl. No.: 14/818,330

(22) Filed: Aug. 5, 2015

(65) Prior Publication Data

US 2016/0266477 A1    Sep. 15, 2016

(30) Foreign Application Priority Data

Mar. 13, 2015    (TW) .............................. 104108119 A

(51) Int. Cl.
G02B 27/01    (2006.01)
G02B 3/00    (2006.01)
G02B 27/48    (2006.01)

(52) U.S. Cl.
CPC ....... *G02B 27/0101* (2013.01); *G02B 3/0056* (2013.01); *G02B 27/48* (2013.01)

(58) Field of Classification Search
CPC . G02B 27/0101; G02B 3/0056; G02B 3/0037
USPC .................. 353/38; 359/620, 619, 630, 13
See application file for complete search history.

(56) References Cited

U.S. PATENT DOCUMENTS

| | | | |
|---|---|---|---|
| 6,714,331 B2 | 3/2004 | Lewis et al. | |
| 7,715,103 B2 | 5/2010 | Sprague et al. | |
| 7,830,607 B2 | 11/2010 | Hotta et al. | |
| 8,422,137 B2 | 4/2013 | Kikuchi et al. | |
| 2006/0247609 A1* | 11/2006 | Mirkov | A61B 18/203 606/9 |
| 2010/0214635 A1 | 8/2010 | Sasaki et al. | |
| 2012/0218641 A1 | 8/2012 | Kikuchi et al. | |
| 2012/0224172 A1 | 9/2012 | Goodwin et al. | |
| 2014/0063359 A1 | 3/2014 | Chen | |

FOREIGN PATENT DOCUMENTS

| | | |
|---|---|---|
| CN | 101868750 | 10/2010 |
| CN | 103995420 | 8/2014 |
| TW | 200720783 | 6/2007 |
| TW | 200846699 | 12/2008 |

(Continued)

OTHER PUBLICATIONS

Fan Chao, et al., "Development of a Micromirror Based Laser Vector Scanning Automotive HUD," Proceedings of the 2011 IEEE, International Conference on Mechatronics and Automation, Aug. 7-10, Beijing, China, pp. 75-79.

(Continued)

*Primary Examiner* — Ryan Howard
(74) *Attorney, Agent, or Firm* — JCIPRNET

(57) ABSTRACT

An optical device including a first lens array is provided. The first lens array has micro-lens units arranged in an array. An outline of each of the micro-lens units is polygonal-shaped, circular or ellipsoidal. Moreover, a projection apparatus is also provided.

22 Claims, 14 Drawing Sheets

(56) References Cited

FOREIGN PATENT DOCUMENTS

TW   201409450   3/2014
TW   I431398     3/2014

OTHER PUBLICATIONS

Haruhiko Okumura, et al., "Hyperrealistic Head-Up-Display for Automotive Application," 2011 IEEE International Conference on Consumer Electronics (ICCE), Jan. 9-12, 2011, pp. 875-876.

Krittiya Tangmanee, et al., "Effects of Guided Arrows on Head-Up Display Towards the Vehicle Windshield," 2012 Southeast Asian Network of Ergonomics Societies Conference (SEANES), Jul. 9-12, 2012, pp. 1-6.

V.Charissis, et al., "Evaluation of Prototype Automotive Head-Up Display Interface: Testing Driver's Focusing Ability through a VR Simulation," Proceedings of the 2007 IEEE Intelligent Vehicles Symposium Istanbul, Turkey, Jun. 13-15, 2007, pp. 560-565.

Park Min Hee, et al., "Development of Circumstance-based Variable Information Structure for Head Up Display in a Car," 2011 3rd International Conference on Data Mining and Intelligent Information Technology Applications (ICMiA), Oct. 24-26, 2011, pp. 127-130.

"Office Action of Taiwan Counterpart Application", dated Feb. 14, 2017, p. 1-p. 6.

"Office Action of China Counterpart Application," dated Jul. 11, 2017, pp. 1-7.

\* cited by examiner

OPTICAL DEVICE AND PROJECTION APPARATUS

CROSS-REFERENCE TO RELATED APPLICATION

This application claims the priority benefit of Taiwan application serial no. 104108119, filed on Mar. 13, 2015. The entirety of the above-mentioned patent application is hereby incorporated by reference herein and made a part of this specification.

TECHNICAL FIELD

The technical field relates to an optical device and a projection apparatus.

BACKGROUND

Originally, the head-up display (HUD) is the display system for a military fighter plane. With the HUD, the pilot is able to view the important information of the assignment without having to lower his/her head. In this way, the attention is not interrupted. Since the HUD is able to provide improved security, the HUD has been broadly applied in the market of vehicles in recent years.

HUDs can be divided into "reflective type" and "virtual image display" type. The "reflective type" HUD uses a low-transmissive film in a deep color to reflect an image projected by a projection unit. However, the image of the "reflective type" HUD can only be displayed on the windscreen panel, making the user feel tired visually due to alternately viewing at long and short distances when paying attention to the traffic and to the contents of the display. Also, the "reflective type" HUD is unable to display an image with a higher resolution. The "virtual image display" HUD solves the aforesaid issues. The "virtual image display" includes a projection unit emitting an image beam, a real image forming device receiving the image beam and forming an image, such as a transparent diffuser, and a virtual image forming unit that enlarges a real image into a virtual image. In the conventional art, an obscure glass is commonly used as the diffuser. However, the obscure glass is formed by applying a surface treatment process such as mechanical sand blasting, manual polishing, or corrosion with hydrofluoric acid to a flat glass. The obscure glass has a rough surface and an uneven structure. Thus, when the obscure glass is used as a diffuser in the projection apparatus, the image formed accordingly may contain irregular shades due to microstructures on the rough surface. Also, the coherence of laser may result in interferences on the surface of the diffuser, leading to generation of sparkle noises of laser. Thus, the image quality of the virtual image generated by the projection apparatus may be unfavorable.

SUMMARY

An embodiment of the disclosure provides an optical device including a first lens array. The first lens array has a plurality of micro-lens units arranged into an array. An outline of each of the micro-lens units is polygonal-shaped, circular, or ellipsoidal. Each of the micro-lens units includes a first optical micro-structure and a second optical micro-structure. The first optical micro-structure has the outline that is polygonal-shaped, circular, or ellipsoidal. The first optical micro-structure surrounds the second optical micro-structure and is connected to the second optical micro-structure. A shape of an outline of the second optical micro-structure is the same as or different from a shape of the outline of the first optical micro-structure.

An embodiment of the disclosure provides an optical device including a first lens array having a plurality of micro-lens units. The micro-lens units are arranged into an array. An outline of each of the micro-lens units is ellipsoidal.

An embodiment of the disclosure provides an optical device including a first lens array having a plurality of micro-lens units. The micro-lens units are arranged into an array. An outline of each of the micro-lens units is circular, and there is a circular hole inside each of the micro-lens units.

An embodiment of the disclosure provides an optical device including a first lens array and a second lens array. The first lens array has a plurality of micro-lens units. The micro-lens units are arranged into an array, and an outline of each of the micro-lens units is polygonal-shaped, circular, or ellipsoidal. The second lens array is disposed beside the first lens array and has a plurality of columnar lenses parallel to each other.

An embodiment of the disclosure provides a projection apparatus including a projection unit emitting an image beam and a real image forming device disposed on a transmitting path of the image beam. The image beam forms an image on the real image forming device. The real image forming device is the aforesaid optical device. A virtual image forming unit, such as a concave lens, may be optionally disposed. The real image forming device is disposed within a focal length of the virtual image forming unit, so as to convert the image on the real image forming device into a virtual image.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
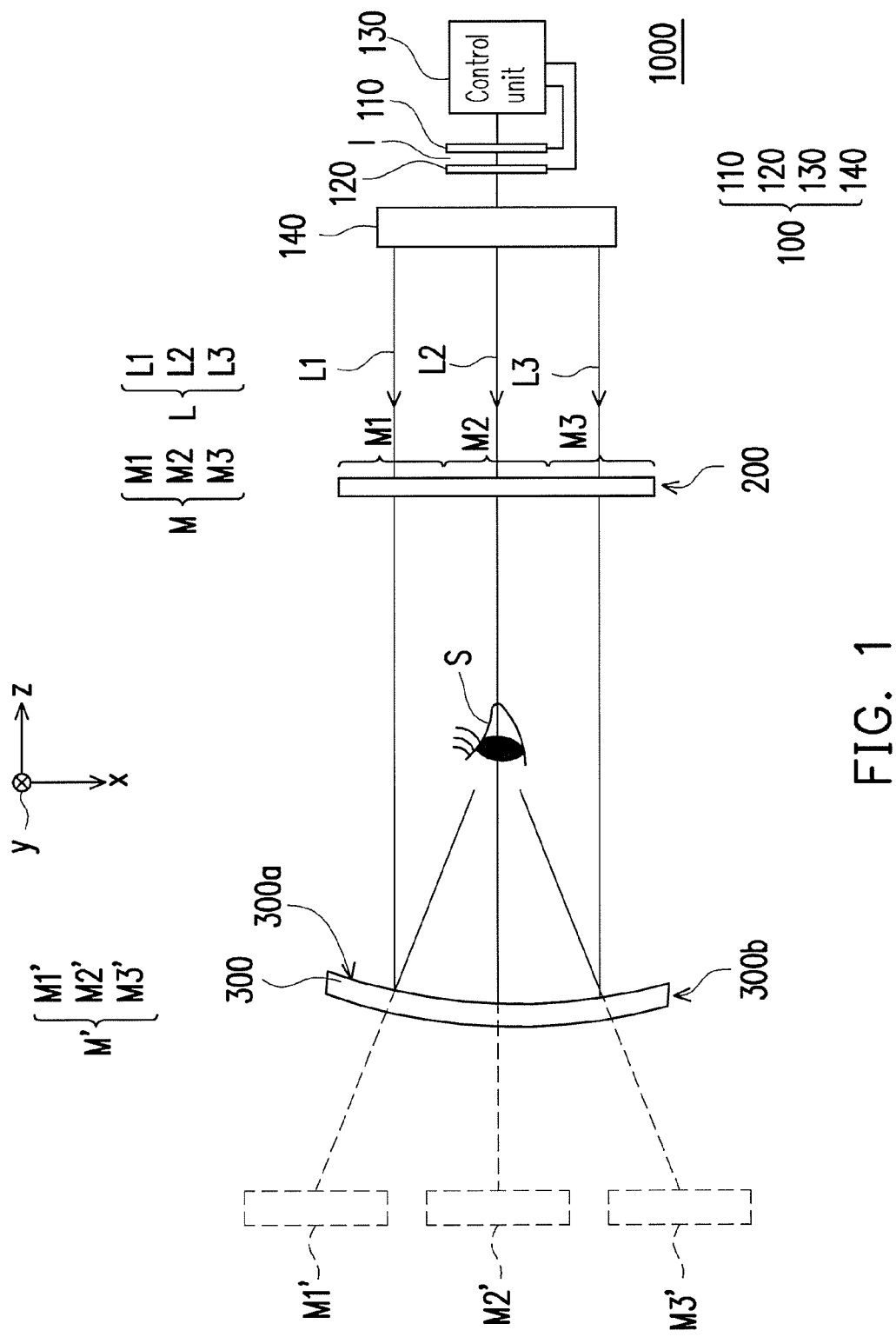
FIG. 1 is a schematic view illustrating a projection apparatus according to an embodiment of the disclosure.

FIG. 1 is a schematic view illustrating a projection apparatus according to an embodiment of the disclosure. For the ease of description, some drawings illustrating the embodiments of the disclosure mark three directions, x, y, and z that are perpendicular to each other. Referring to FIG. 1, a projection apparatus 1000 includes a projection unit 100 and a real image forming device 200. The projection unit 100 emits an image beam L. The real image forming device 200 is disposed on a transmitting path of the image beam L. The image beam L forms an image M on the real image forming device 200. In this embodiment, the projection apparatus 1000 may optionally include a virtual image forming unit 300. The real image forming device 200 is disposed within a focal length of the virtual image forming unit 300 to allow the virtual image forming unit 300 to enlarge the image M into a virtual image M'. In this embodiment, the virtual image forming unit 300 is a concave lens having a concave surface 300a, for example. The concave surface 300a has a coating layer, so as to partially reflect and partially transmit the image M. However, the disclosure is not limited thereto. In other embodiments, the virtual image forming unit 300 may be configured in other suitable ways. For example, the virtual image forming unit 300 may also include a plurality of optical devices, such as a combination of at least two of an imaging lens, a reflective mirror, a transflective mirror, and other suitable components.

Figure 2:
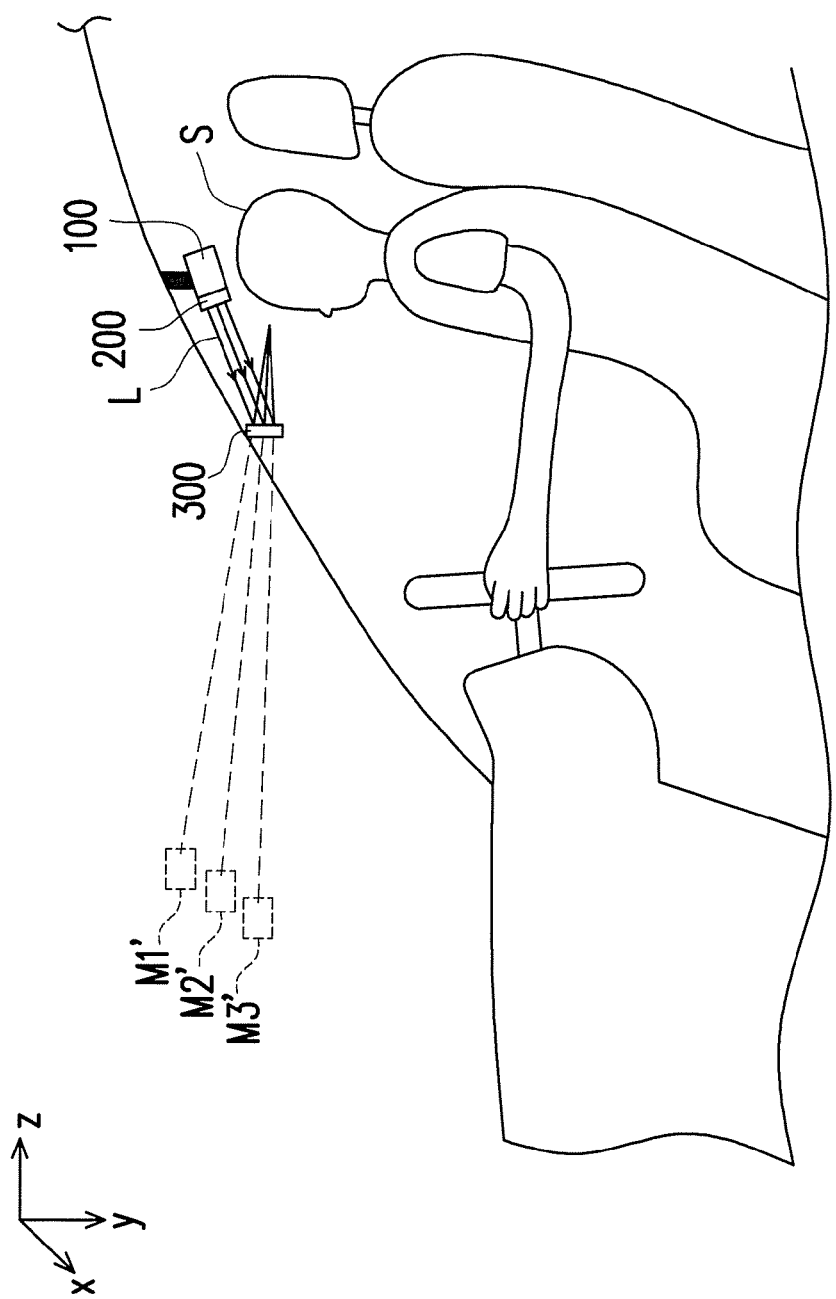
FIG. 2 is a schematic view illustrating an application of a projection apparatus according to an embodiment of the disclosure.
Figure 3:
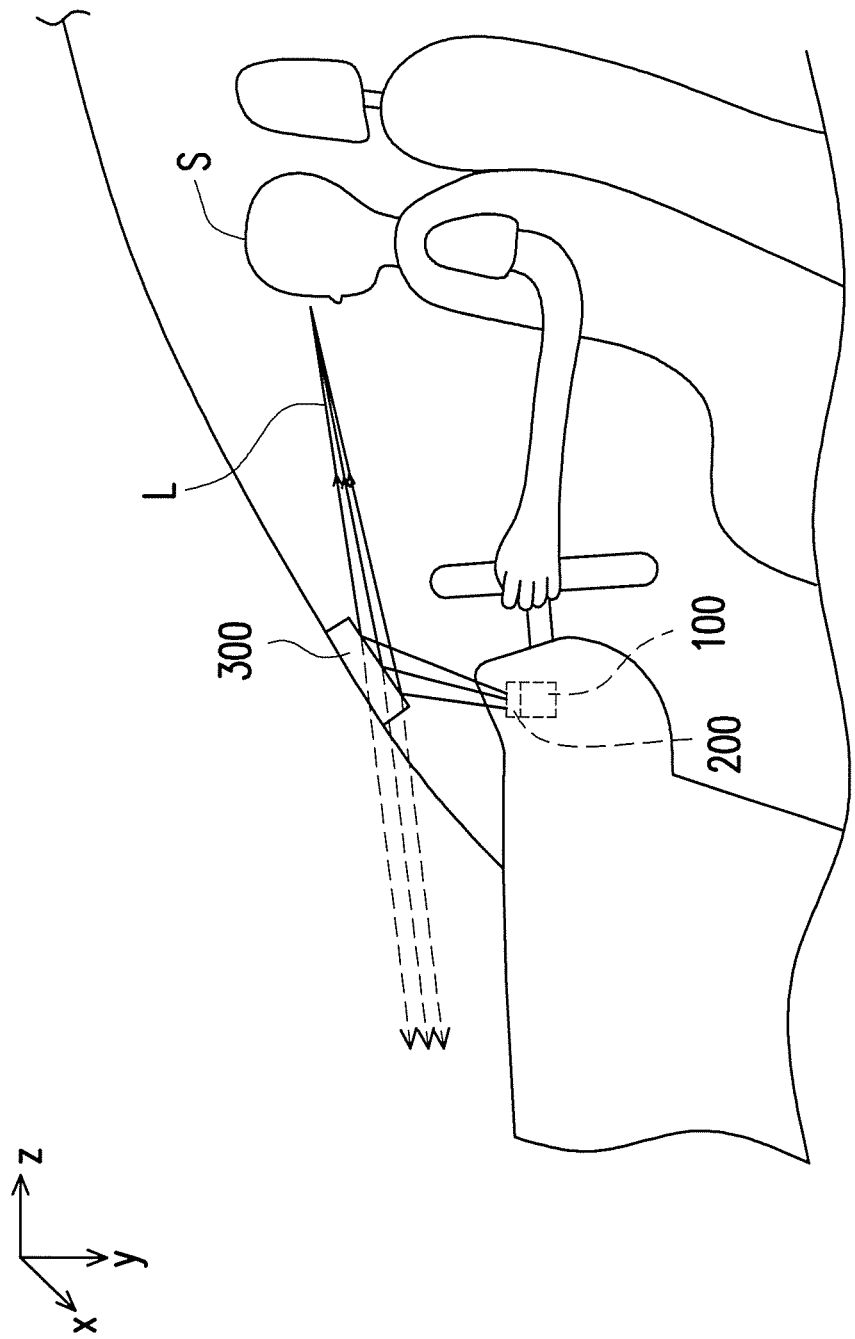
FIG. 3 is a schematic view illustrating another application of a projection apparatus according to an embodiment of the disclosure.

FIG. 2 is a schematic view illustrating an application of a projection apparatus according to an embodiment of the disclosure. Referring to FIG. 2, the projection apparatus 1000 of this embodiment may be optionally used in a vehicle (e.g., a car, train, airplane, ship, etc.) as a head-up display. To be more specific, when the projection apparatus 1000 serves as a head-up display, in the embodiment shown in FIG. 2, the virtual image forming unit 300 may be optionally disposed on a windscreen panel, and the projection unit 100 and the real image forming device 200 may be optionally hung at a top portion of the vehicle. However, the disclosure is not limited thereto. FIG. 3 is a schematic view illustrating another application of a projection apparatus according to an embodiment of the disclosure. In the embodiment shown in FIG. 3, the virtual image forming unit 300 may be disposed on the windscreen panel, while the projection unit 100 and the real image forming device 200 may be disposed in or above a meter panel.

In the disclosure, while the projection apparatus 1000 is described as a head-up display including the virtual image forming unit 300, the projection apparatus of the disclosure is not limited to be a head-up display. Also, the disclosure does not intend to limit that the projection apparatus has to include the virtual image forming unit 300. For example, in another embodiment, the projection apparatus 1000 having the virtual image forming unit 300 may also be applied in other suitable occasions. For example, the projection apparatus 1000 having the virtual image forming unit 300 may serve as a head mount display (HMD). In yet another embodiment, the projection apparatus may not include the virtual image forming unit 300 and may serve as a projector that directly projects to form an image (e.g., a real image type head-up display), and the user may directly view the image M formed on the real image forming device 200.

Referring to FIG. 1, the projection unit 100 includes a light source 110 that emits an illumination beam 1 and a light valve 120 disposed on a transmitting path of the illumination beam 1. In this embodiment, the projection unit 100 may optionally include a control unit 130 electrically connected to the light source 110 and the light valve 120. The control unit 130 makes the light source 110 and the light valve 120 work together to emit the image beam L carrying image information. In this embodiment, the light source 110 is laser, for example, and the light valve 120 is a micro-electromechanical scan lens, for example. The micro-electromechanical scan lens may be driven in a piezoelectric, electrostatic, electromagnetic way, or other suitable ways. However, the disclosure is not limited thereto. In other embodiments, the light source 110 may also be a light-emitting diode (LED) or other light-emitting devices, and the light valve 120 may also be a liquid crystal display, a liquid crystal on silicon (LCoS) display, a digital micromirror device (DMD) display or other suitable display devices.

Figure 4:
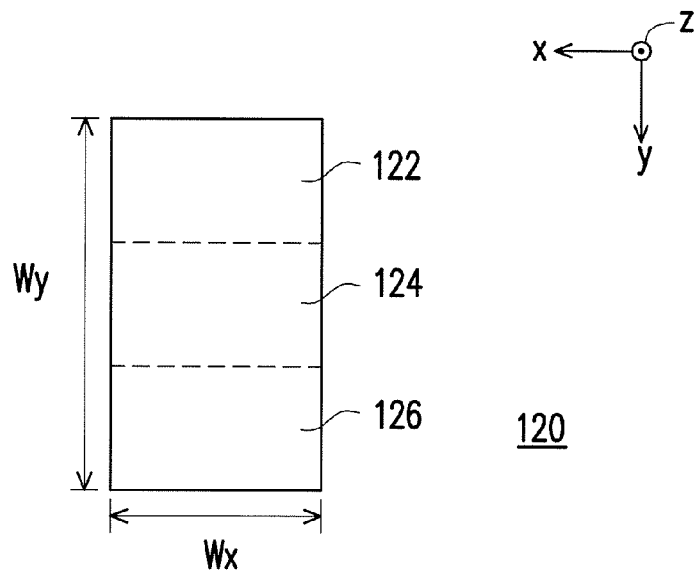
FIG. 4 is a schematic view illustrating a light valve according to an embodiment of the disclosure.
Figure 5:
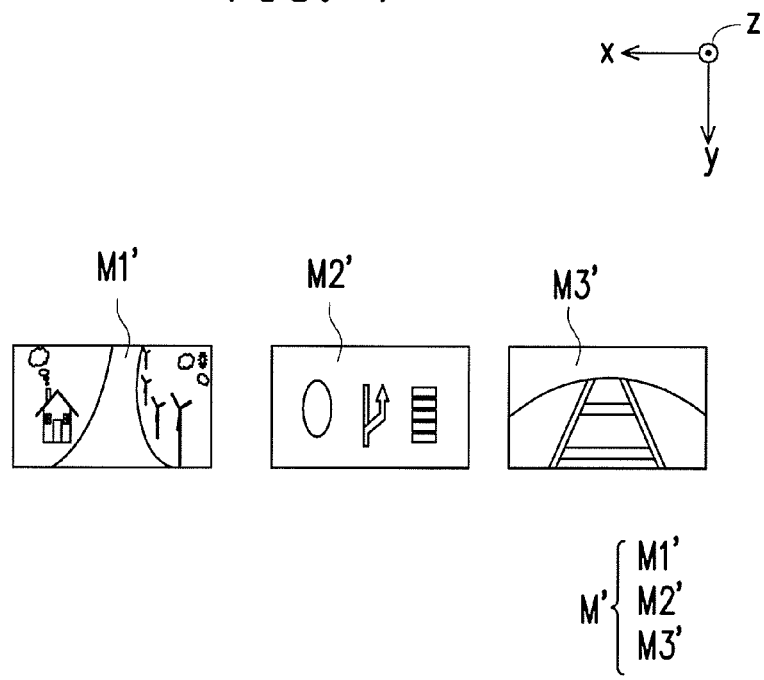
FIG. 5 is a schematic view illustrating a virtual image according to an embodiment of the disclosure.

FIG. 4 is a schematic view illustrating a light valve according to an embodiment of the disclosure. A horizontal display width Wx of the light valve 120 is smaller than a vertical display width Wy. FIG. 5 is a schematic view illustrating a virtual image according to an embodiment of the disclosure.

Referring to FIGS. 1, 4, and 5, in this embodiment, a user S may make a plurality of areas 122, 124, and 126 (shown in FIG. 4) of the light valve 120 have different states based on practical needs, such that the illumination beam 1 transmitted to the areas 122, 124, and 126 is converted into a plurality of sub-image beams L1, L2, and L3 carrying different information, thereby making the user S able to receive a variety of information, as shown in FIG. 5, at the same time. In addition, the user S may optionally use an optical module (e.g., a light-splitting module 140) to re-arrange the image information in the different areas 122, 124, and 126 of the light valve 120, so as to view the wide virtual image M' as shown in FIG. 5. In other words, the projection apparatus 1000 may optionally display multiple images. However, the disclosure is not limited thereto. In other embodiments, the projection apparatus may optionally display a single image.

Referring to FIG. 1, specifically speaking, the projection unit 100 of this embodiment may optionally include the light-splitting module 140. The light-splitting module 140 may be formed of a plurality of optical lens sets (not shown). Each of the optical lens sets (not shown) includes at least one reflective mirror or a lens. In this embodiment, the optical lens set disposed on a transmitting path of the sub-image beam L1 may be formed of two reflective mirrors, the optical lens set disposed on a transmitting path of the sub-image beam L3 may be formed of two reflective mirrors, and the optical lens set disposed on a transmitting path of the sub-image beam L2 may be formed of a lens.

Referring to FIGS. 1, 4, and 5, through the light-splitting module 140, the image information originally arranged in order in the areas 122, 124, and 126 along the y direction (i.e., the sub-image beams L1, L2, and L3 sequentially arranged along the y direction) are re-arranged, such that the sub-image beams L1, L2, and L3 may respectively form a plurality of sub-images M1, M2, and M3 arranged in order in the x direction when being transmitted to the real image forming device 200. In this way, through the virtual image forming unit 300, the user S may see virtual sub-images M1', M2', and M3' arranged in order in the x direction. The virtual sub-images M1', M2', and M3' form the wide virtual image M'. In this embodiments, the y direction where the sub-image beams L1, L2, and L3 are arranged and the x direction where the virtual sub-images M1', M2', and M3' are arranged (and the direction x where the sub-images M1, M2, and M3 are arranged) are not parallel to each other. The directions may be perpendicular to each other, for example. However, the disclosure is not limited thereto. A relation between the y direction where the sub-image beams L1, L2, and L3 are arranged and the x direction where the virtual sub-images M1', M2', and M3' are arranged (and the x direction where the sub-images M1, M2, and M3 are arranged) may also be appropriately adjusted by modulating the light-splitting module 140 (e.g., by adjusting an included angle between at least one of the reflective mirrors and the corresponding sub-image beam). The light-splitting module 140 shown in FIG. 1 merely represents one way of re-arranging the sub-image beams L1, L2, and L3, and the way of re-arranging the sub-image beams L1, L2, and L3 is not limited to the way of using the light-splitting module 140. In other embodiments, other types of optical modules may be used to re-arrange the image information in the different areas 122, 124, and 126 of the light valve 120. In addition, the projection apparatus of the disclosure does not always include an optical module (e.g. the light-splitting module 140) that re-arranges the image information in the different areas 122, 124, and 126. In other embodiments, the projection apparatus may not include the optical module (e.g., the light-splitting module 140) that re-arranges the image information in the different areas 122, 124, and 126.

Figure 6:
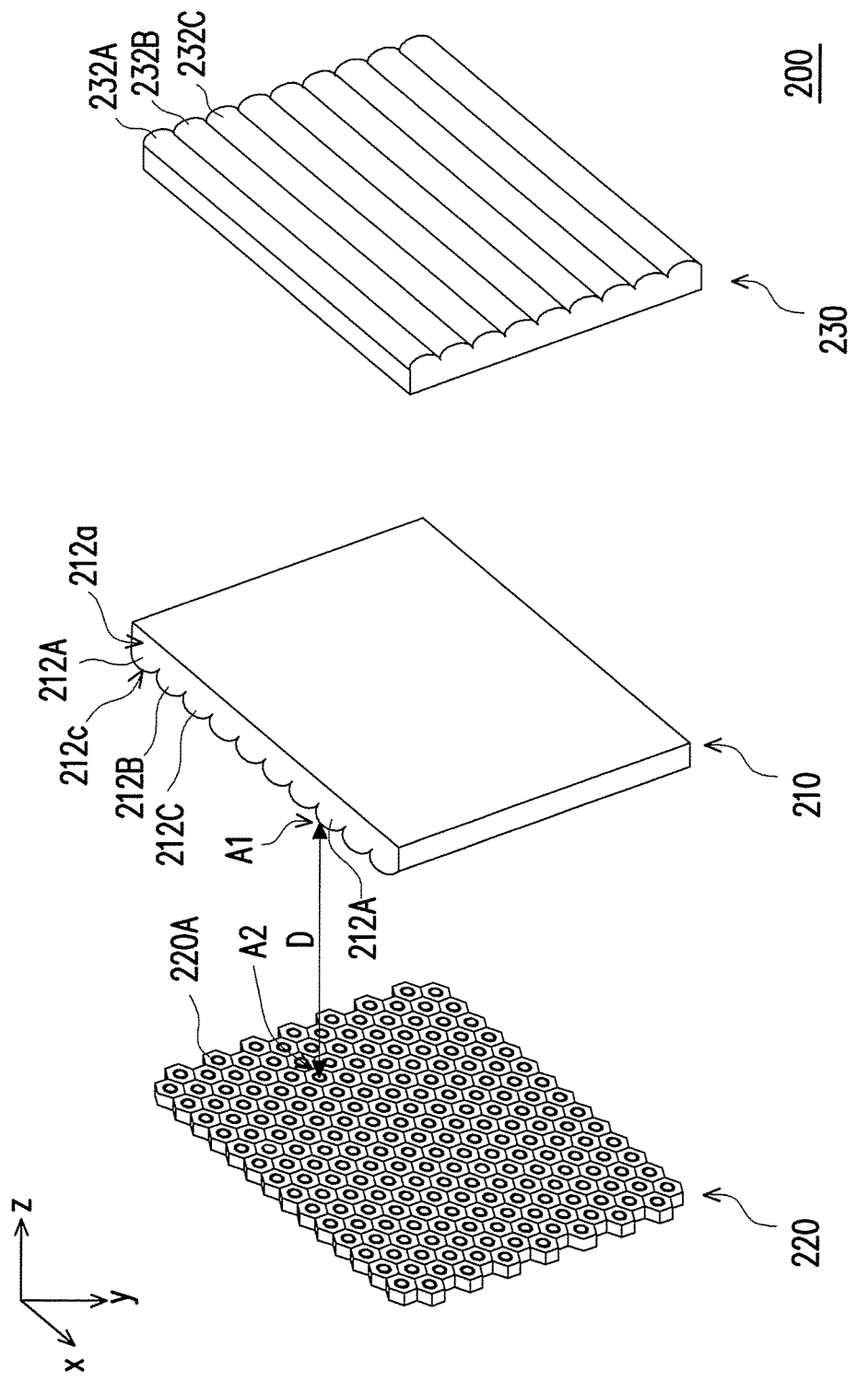
FIG. 6 is a schematic perspective view illustrating a real image forming device according to an embodiment of the disclosure.
Figure 7:
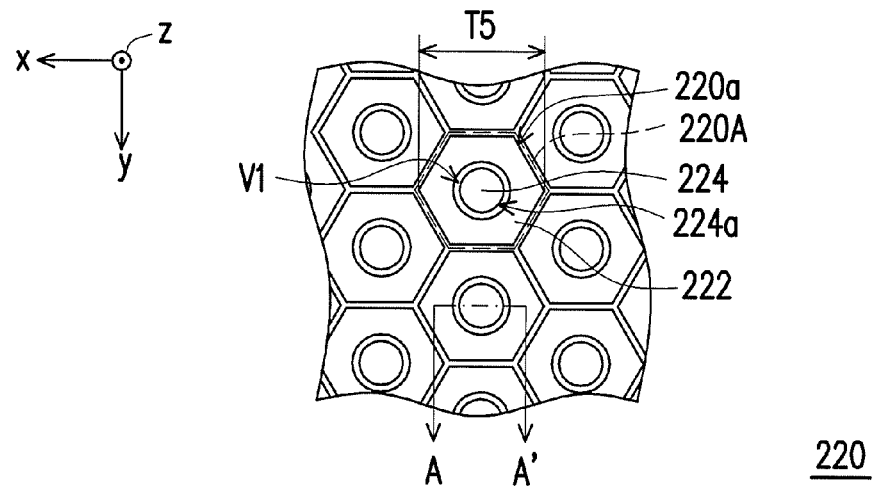
FIG. 7 is a schematic front view illustrating a first lens array according to an embodiment of the disclosure.
Figure 8:
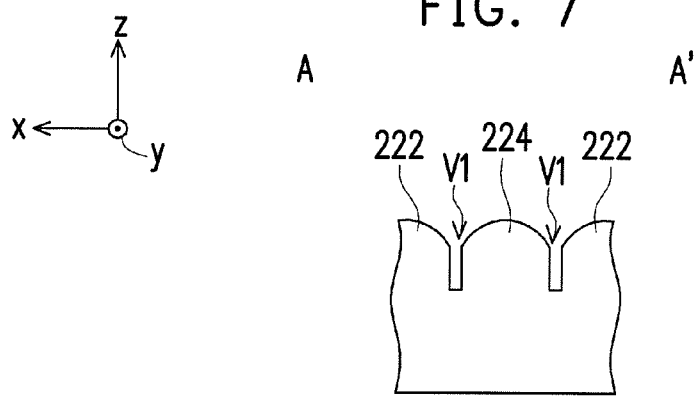
FIG. 8 is a schematic cross-sectional view illustrating the first lens array corresponding to a cross-sectional line A-A' shown in FIG. 7.

FIG. 6 is a schematic perspective view illustrating a real image forming device according to an embodiment of the disclosure. Referring to FIG. 6, the real image forming device 200 is an optical device. The real imaging forming device 200 at least includes a first lens array 220. FIG. 7 is a schematic front view illustrating a first lens array according to an embodiment of the disclosure. FIG. 8 is a schematic cross-sectional view illustrating the first lens array corresponding to a cross-sectional line A-A' shown in FIG. 7. Referring to FIGS. 6, 7, and 8, the first lens array 220 has a plurality of micro-lens units 220A. The micro-lens units 220A are arranged into an array. In particular, an outline 220a of each of the micro-lens units 220A (shown in FIG. 7) is polygonal-shaped. For example, in this embodiment, the outline 220a of each of the micro-lens units 220A is hexagonal, for example, and a maximal outer diameter T5 of each of the micro-lens units 220A is approximately 150 micrometers, for example. However, the disclosure is not limited thereto. The outline 220a of each of the micro-lens units 220A may be triangular, square, pentagonal, hexagonal, heptagonal, octagonal, circular, or in other suitable shapes.

In this embodiment, each of the micro-lens units 220A may optionally include a first optical micro-structure 222 having the polygonal-shaped outline 220a and a second optical micro-structure 224. The first optical micro-structure 222 and the second optical micro-structure 224 protrude toward the same side, as shown in FIG. 8. The first optical micro-structure 222 surrounds the second optical micro-structure 224 and is connected to the second optical micro-structure 224.

In this embodiment, a shape of an outline 224a of the second optical micro-structure 224 may be optionally different from the shape of the outline 220a of the first optical micro-structure 222. In other words, the first optical micro-structure 222 and the second optical micro-structure 224 are separated from each other by the same recess V1, and a shape of the recess V1 is different from the shape of the outline 220a of the first optical micro-structure 222. In this embodiment, the outline 224a (or the shape of the recess V1) of the second optical micro-structure 224 may be circular. However, the disclosure is not limited thereto.

In this embodiment, the first lens array 220 may be manufactured by adopting a semiconductor manufacturing process including steps of photolithography, etching, and reflowing. However, the disclosure is not limited thereto. In other embodiments, the first lens array 220 may also be manufactured by performing a roll-to-roll process, a press molding process, an injection molding process, or other suitable processes. A material of the first lens array 220 may be plastics (e.g., PC, PMMA, etc.), glass, or other suitable transparent materials.

By adopting a design "the outline of each of the micro-lens units of the first lens array is polygonal-shaped, circular, or ellipsoidal", the first lens array 220 is able to diffuse the image beam to suppress speckle noises. Also, the projection unit 100 uses the optical device including the first lens array 220 as the real image forming device, and the image light beam formed on the real image forming device has fewer speckle noises. Thus, an image quality of the projection apparatus 1000 is improved.

Referring to FIG. 6, in this embodiment, the real image forming device 200 may optionally include a second lens array 210. The second lens array 210 is disposed beside the first lens array 220 and has a plurality of columnar micro-lenses 212A parallel to each other. Each of the columnar micro-lenses 212A has a first apex A1, each of the micro-lens units 220A of the first lens array 220 has a second apex A2, a distance between the first apex A1 of each of the columnar micro-lenses 212A and the apex A2 of the corresponding micro-lens unit 220A (i.e., one of the micro-lens units 220A overlapped with the columnar micro-lenses 212A in the z direction perpendicular to the extending direction (i.e., y direction) of the columnar micro-lenses 212A) is D, a focal length of each of the columnar micro-lenses 212A is F1, and a focal length of each of the micro-lens units 220A is F2. In addition, F1≤D≤(30·F1), F2≤D≤(30·F2), or F1≤D≤(30·F1) and F2≤D≤(30·F2). For example, in an embodiment, F1≤D≤(10·F1), F2≤D≤(10·F2), or F1≤D≤(10·F1) and F2≤D≤(10·F2). However, the disclosure is not limited thereto.

Referring to FIGS. 1 and 6, each the columnar micro-lenses 212A of the second lens array 210 is overlapped with the micro-lens units 220A of the first lens array 220 in the z direction. In this embodiment, each of the columnar micro-lenses 212A of the second lens array 210 and each of the micro-lens units 220A of the first lens array 220 may protrude toward different directions. Specifically, in this embodiment, each of the columnar micro-lenses 212A of the second lens array 210 may optionally protrude toward a direction away from the projection unit 100 (e.g., a direction opposite to the z direction), while each of the micro-lens units 220A may optionally protrude toward the projection unit 100 (e.g., protruding along the z direction). However, the disclosure is not limited thereto. In another embodiment, each of the columnar micro-lenses 212A of the second lens array 210 may also optionally protrude toward the projection unit 100 (e.g., along the z direction), and each of the micro-lens units 220A may optionally protrude along the direction away from the projection unit (e.g., the direction opposite to the z direction). In yet another embodiment, each of the columnar micro-lenses 212A of the second lens array 210 and each of the micro-lens units 220A of the first lens array 220 may protrude toward the same direction, such as protruding toward the direction away from the projection unit 100 or protruding toward the direction toward the projection unit 100.

Figure 9:
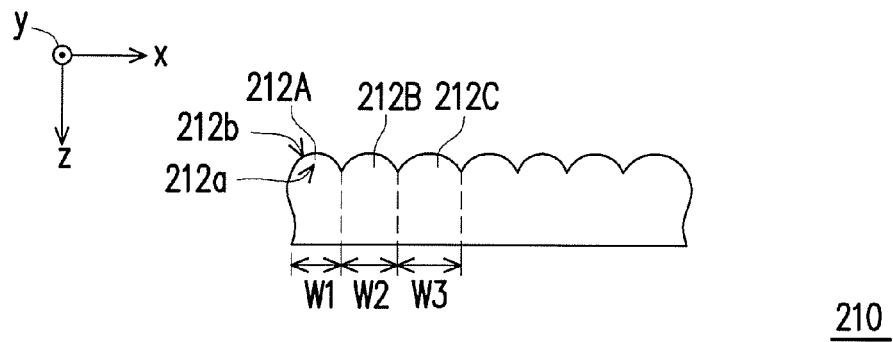
FIG. 9 is a schematic cross-sectional view illustrating a second lens array according to an embodiment of the disclosure.

FIG. 9 is a schematic cross-sectional view illustrating a second lens array according to an embodiment of the disclosure. Referring to FIGS. 6 and 9, the second lens array 210 has a plurality of columnar micro-lenses 212A, 212B, and 212C parallel to each other. A normal direction (e.g., the y direction) of a reference plane (e.g., an xz plane) is parallel to an extending direction of each of the columnar micro-lenses 212A, 212B, and 212C, and the reference plane (e.g., the xz plane) takes a section 212a of each of the columnar micro-lenses 212A, 212B, and 212C. In this embodiment, a periphery 212b (shown in FIG. 9) of the section 212a includes a portion of a curve. In other words, the columnar micro-lenses 212A, 212B, and 212C may be in a semi-cylindrical shape. However, the disclosure is not limited thereto. The columnar micro-lenses 212A, 212B, and 212C may be configured in a different way. For example, in another embodiment, the reference plane (e.g., the xz plane) takes the section 212a of each of the columnar micro-lenses 212A, 212B, and 212C, and the periphery 212b of the section 212a may also include a portion of an ellipse, a portion of a stair, a portion of a triangle, or at least a portion of other suitable shapes. In other words, the columnar micro-lenses 212A, 212B, and 212C may be semi-ellipsoidal column, a triangular column, or in other suitable configurations. In yet another embodiment, each of the columnar micro-lenses has a convex surface. The convex surface may be an aspherical surface. However, the disclosure is not limited thereto.

Referring to FIG. 9, in this embodiment, the normal direction (e.g., the y direction) of the reference plane (e.g., the xz plane) is parallel to the extending direction (e.g., the y direction) of each of the columnar micro-lenses 212A, 212B, and 212C, and the reference plane (e.g., the xz plane) takes the section 212a of each of the columnar micro-lenses 212A, 212B, and 212C. The periphery 212b of the section 212a includes a curved line. A curvature radius of the curved line of the columnar micro-lenses 212A is different from a curvature radius of the curved line of the columnar micro-lens 212B. The curvature radius of the curved line of the columnar micro-lens 212B is different from a curvature radius of the curved line of the columnar micro-lens 212C. The curvature radius of the curved line of the columnar micro-lenses 212A is smaller than the curvature radius of the curved line of the columnar micro-lens 212B. The curvature radius of the curved line of the columnar micro-lens 212B is smaller than the curvature radius of the curved line of the columnar micro-lens 212C. The curvature radius of the curved line of the columnar micro-lenses 212A is 45 micrometers, for example, the curvature radius of the curved line of the columnar micro-lens 212B is 50 micrometers, for example, and the curvature radius of the curved line of the columnar micro-lens 212C is 55 micrometers, for example. The columnar micro-lenses 212A, 212B, and 212C may be arbitrarily distributed. However, the columnar micro-lenses of the disclosure are not limited to the above.

From another perspective, the columnar micro-lenses 212A, 212B, and 212C are arranged along the x direction, and the columnar micro-lenses 212A, 212B, and 212C respectively have widths W1, W2, and W3 (shown in FIG. 9) in the x direction. The width W1 of the columnar micro-lenses 212A in the x direction is different from the width W2 of the columnar micro-lens 212B in the x direction. The width W2 of the columnar micro-lens 212B in the x direction is different from the width W3 of the columnar micro-lens 212C in the x direction. The width W1 of the columnar micro-lenses 212A in the x direction is smaller than the width W2 of the columnar micro-lens 212B in the x direction. The width W2 of the columnar micro-lens 212B in the x direction is smaller than the width W3 of the columnar micro-lens 212C in the x direction. For example, the width W1 of the columnar micro-lenses 212A is 50 micrometers, for example, the width W2 of the columnar micro-lens 212B is 55 micrometers, for example, and the width W3 of the columnar micro-lens 212C is 60 micrometers, for example. The columnar micro-lenses 212A, 212B, and 212C may be randomly distributed. However, the columnar micro-lenses of the disclosure are not limited to the above.

In this embodiment, the second lens array 210 may be manufactured by performing a roll-to-roll process. Specifically, a blade of an ultra-precision processing machine is used to scribe on the roller, so as to form a specific micro-structure on a surface of the roller. Then, the roller having the specific micro-structure is used to print a surface of a transparent ductile body, so as to form the second lens array 210. However, the disclosure is not limited thereto. In other embodiments, the second lens array 210 may be manufactured by adopting a semiconductor manufacturing process that includes the steps of photolithography, etching, and reflowing, a press molding process, an injection molding process, or other suitable processes. A material of the second lens array 210 may be plastics (e.g., PC, PMMA, etc.), glass, or other suitable transparent materials.

By adopting a design that the curvature radiuses and/or the widths W1, W2, and W3 of the columnar micro-lenses 212A, 212B, and 212C are variable, the image beam L (e.g., a laser beam) emitted by the projection unit 100 is less likely to generate an easily noticeable constructive and/or destructive pattern due to a structure of the second lens array 210 and/or the first lens array 220. In this way, the speckle noises may be further reduced. In other words, by disposing the second lens array 210, a chance that a laser speckle is generated on the real image forming device 200 or a laser speckle on the second lens array 210 is noticed is further reduced. However, the configuration of the second lens array of the disclosure is not limited to the above. The second lens array may also be in other suitable configurations. For example, in other embodiments, the curvature radiuses of the curved lines of the columnar micro-lenses 212A, 212B, and 212C may be the same, and the widths W1, W2, and W3 of the columnar micro-lenses 212A, 212B, and 212C may also be the same. The second lens array in other embodiments also falls within the scope claimed in the disclosure.

Referring to FIG. 6, in this embodiment, the real image forming device 200 may optionally include a third lens array 230. The third lens array 230 has a plurality of columnar micro-lenses 232A, 232B, and 232C parallel to each other. Possible configurations, forming methods, and materials of the columnar micro-lenses 232A, 232B, and 232C of the third lens array 230 are the same as those of the columnar micro-lenses 212A, 212B, and 212C of the second lens array 210. Thus, details in this respect are not reiterated in the following. The columnar micro-lenses 212A, 212B, and 212C of the second lens array 210 are arranged along the x direction, the columnar micro-lenses 232A, 232B, and 232C of the third lens array 230 are arranged along the y direction, and the x and y directions are not parallel to each other. In this embodiment, the x direction where the columnar micro-lenses 212A, 212B, and 212C of the second lens array 210 are arranged may be perpendicular to the y direction where the columnar micro-lenses 232A, 232B, and 232C of the third lens array 230 are arranged. However, the disclosure is not limited thereto. In other embodiments, an included angle between the x direction where the columnar micro-lenses 212A, 212B, and 212C of the second lens array 210 are arranged and the y direction where the columnar micro-lenses 232A, 232B, and 232C of the third lens array 230 are arranged may be an angle other than 0 or 90 degrees.

Moreover, in other embodiments, the third lens array 230 may also be replaced by an optical device the same as the first lens array 220 in the embodiments described in the preceding paragraphs or the same as the first lens array in the embodiments of the following paragraphs. More specifically, when the third lens array 230 is replaced by an optical device the same as any kind of the first lens array, an angle may be included between the outline of the micro-lens unit of the first lens array and an outline of the micro-lens unit of the third lens array, and orthogonal projections of the outlines of the third and first lens arrays may not coincide with each other. For example, when the third lens array 230 is replaced by an optical device the same as the first lens array 220 shown in FIG. 7, an angle may be included between a side of the outline 220a of the micro-lens unit 220A of the first lens array 220 and a corresponding side of the outline of the micro-lens unit of the third lens array. The angle may be 30 degrees, for example, but the disclosure is not limited thereto.

Figure 10:
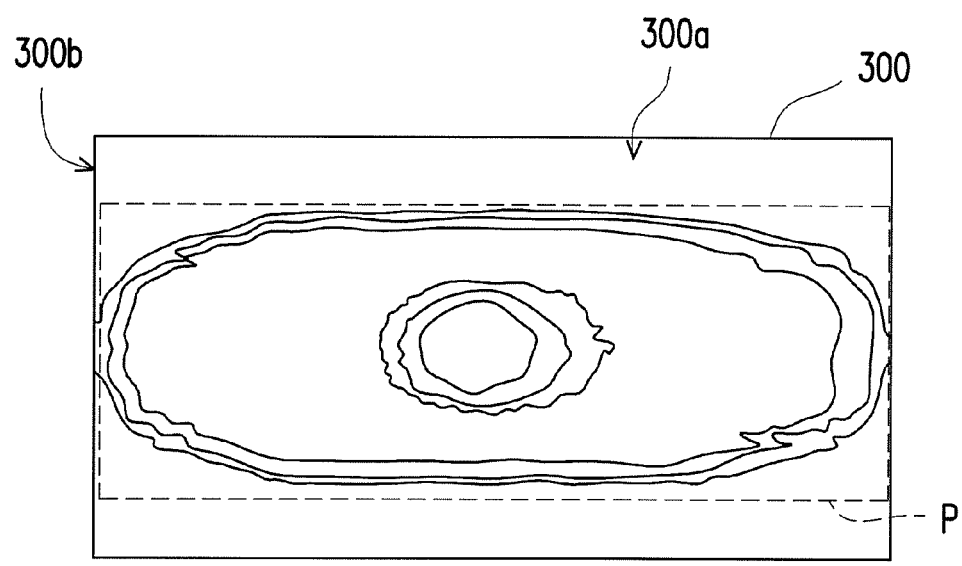
FIG. 10 is a schematic front view illustrating a virtual image forming unit and a schematic view illustrating a light field distribution on the virtual image forming unit according to an embodiment of the disclosure.

FIG. 10 is a schematic front view illustrating a virtual image forming unit and a schematic view illustrating a light field distribution on the virtual image forming unit according to an embodiment of the disclosure. Referring to FIGS. 1, 6, and 10, in this embodiment, the second lens array 210 has the columnar micro-lenses 210A parallel to each other, and the outline 220a of each of the micro-lens units 220A of the first lens array 220 is polygonal-shaped, circular, or ellipsoidal. By using the second lens array 210 and the first lens array 220 together, a light field distribution of the image beam L projected on the real image forming device 200 is approximately rectangular. When the real image forming device 200 is used in the projection apparatus 1000 including the virtual image forming unit 300, a light field distribution P of the image beam L formed on the concave surface 300a of the virtual image forming unit 300 mostly falls within a periphery 300b of the virtual image forming unit 300 that is also rectangular. In other words, most of the image beam L may be used by the virtual image forming unit 300. Thus, the projection apparatus 1000 has a high light field utilization rate.

In addition, by using the second lens array 210 with the first lens array 220, the image beam L may be further diffused by the real image forming device 220. Thus, significant speckle noises as in the conventional art are less likely not occur. Specifically, by adopting the design "the real image forming device 200 includes the second lens array 210 and the first lens array 220, the second lens array has the columnar micro-lens 210A parallel each other, and the outline 220a of each micro-lens unit 220A of the first lens array 220 is polygonal-shaped, circular, or ellipsoidal", a speckle contrast of the image formed in the real image forming device 200 is significantly lower than a speckle contrast of an obscure glass in the conventional art. Here, the speckle contrast refers to a ratio between "a standard deviation of a light intensity in an image" and "an average of the light intensity in the image". It should be noted that the example showing that the speckle contrast is reduced above merely servers to explain that the real image forming device 200 having a special structure is certainly able to suppress the light field distribution noises, and the disclosure is not limited thereto. Regardless of the speckle contrast, any optical device having the characteristics "the first lens array includes a plurality of micro-lens units arranged into an array, and an outline of each of the micro-lens units is polygonal-shaped, circular, or ellipsoidal" and a projection apparatus including such an optical device fall within the scope claimed in the disclosure.

While the real image forming device 200 is described as an optical device including the first, second and third lens arrays 220, 210, and 230 at the same time, for example, the disclosure does not limit that the real image forming device has to include the second and third lens arrays 210 and 230. In other words, optical devices including only the first lens array 220, including the first and second lens arrays 220 and 210, and including the first and third lens array 220 and 230 also fall within the scope of the real image forming device claimed in the disclosure.

Moreover, the configuration of the first lens array of the disclosure is not limited to the first lens array 220 described above. The first lens array 220 above may be replaced by the first lens array in other suitable configurations. In the following, examples are described with reference to the drawings.

Figure 11:
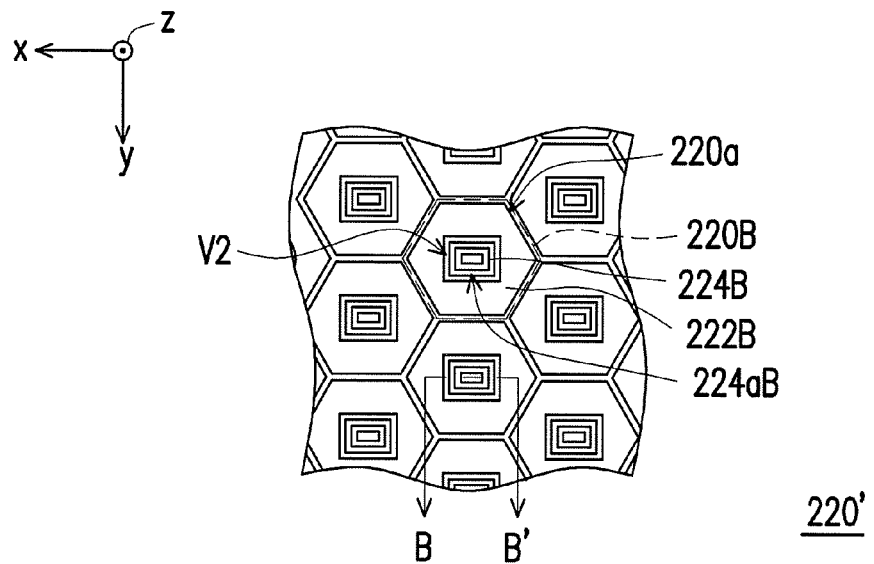
FIG. 11 is a schematic front view illustrating a first lens array according to another embodiment of the disclosure.
Figure 12:
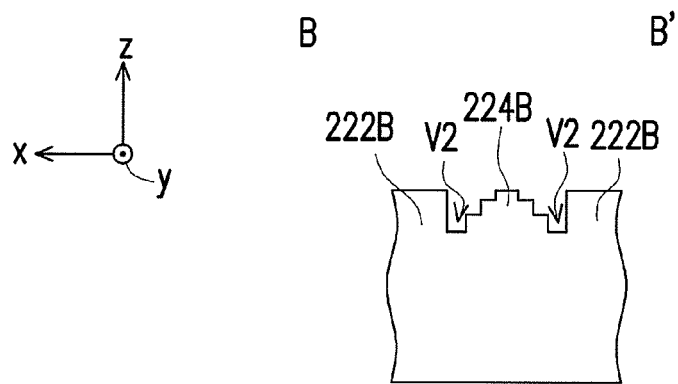
FIG. 12 is a schematic cross-sectional view illustrating the first lens array corresponding to a cross-sectional line B-B' shown in FIG. 11.

FIG. 11 is a schematic front view illustrating a first lens array according to another embodiment of the disclosure. FIG. 12 is a schematic cross-sectional view illustrating the first lens array corresponding to a cross-sectional line B-B' shown in FIG. 11. Referring to FIGS. 11 and 12, a first lens array 220' has a plurality of micro-lens units 220B arranged into an array. Each of the micro-lens units 220B may optionally include a first optical micro-structure 222B having the polygonal-shaped outline 220a and a second optical micro-structure 224B having a polygonal-shaped outline 224aB. The first optical micro-structure 222B and the second optical micro-structure 224B protrude toward the same side, as shown in FIG. 12. The first optical micro-structure 222B surrounds the second optical micro-structure 224B and is connected to the second optical micro-structure 224B. A shape of the outline 224aB of the second optical micro-structure 224B is different from a shape of the outline 220a of the first optical micro-structure 222B. In other words, the optical first micro-structure 222B and the second optical micro-structure 224B are separated from each other by the same recess V2, and a shape of the recess V2 is different from the shape of the outline 220a of the first optical micro-structure 222B. For example, the outline 224aB (or the shape of the recess V2) of the second optical micro-structure 224B may be in a polygonal shape other than hexagon, such as rectangle. More specifically, as shown in FIG. 12, the second optical micro-structure 224B of this embodiment may be a step-like structure. For example, the second optical micro-structure 224B may form into a step-like structure similar to a pyramid through stacking. However, the disclosure is not limited thereto. A configuration of the second optical micro-structure 224B may be suitably designed based on the practical needs.

Figure 13:
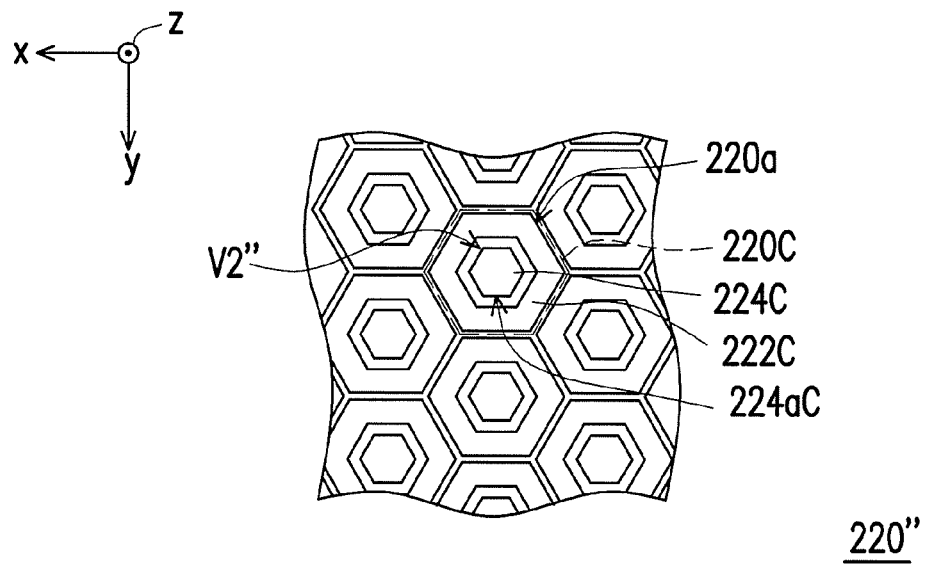
FIG. 13 is a schematic front view illustrating a first lens array according to yet another embodiment of the disclosure.

FIG. 13 is a schematic front view illustrating a first lens array according to yet another embodiment of the disclosure. Referring to FIG. 13, a first lens array 220" shown in FIG. 13 is similar to the first lens array 220' shown in FIG. 11, except that a shape of an outline 224aC of a second optical micro-structure 224C of the first lens array 220" is different from a shape of the outline 224aB of the second optical micro-structure 224B of the first lens array 220'. Specifically, the first lens array 220" has a plurality of micro-lens units 220C arranged into an array. Each of the micro-lens units 220C may optionally include a first optical micro-structure 222C having the polygonal-shaped outline 220a and the second optical micro-structure 224C having the polygonal-shaped outline 224aC. The first optical micro-structure 222C and the second optical micro-structure 224C protrude toward the same side. The first optical micro-structure 222C surrounds the second optical micro-structure 224C and is connected to the second optical micro-structure 224C. A shape of the outline 224aC of the second optical micro-structure 224C is the same as the shape of the outline 220a of the first optical micro-structure 222C. For example, the outline 224aC and the outline 220a are both hexagon-shaped. In other words, the first optical micro-structure 222C and the second optical micro-structure 224C are separated from each other by the same recess V2", and a shape of the recess V2" is the same as the outline 220a of the first optical micro-structure 222C. For example, the outline 224aC (or the shape of the recess V2") of the second optical micro-structure 224C may be in a hexagon shape or other polygonal shapes similar to the outline 220a. However, the disclosure is not limited thereto. A configuration of the second optical micro-structure 224C may be suitably designed based on the practical needs.

Figure 14:
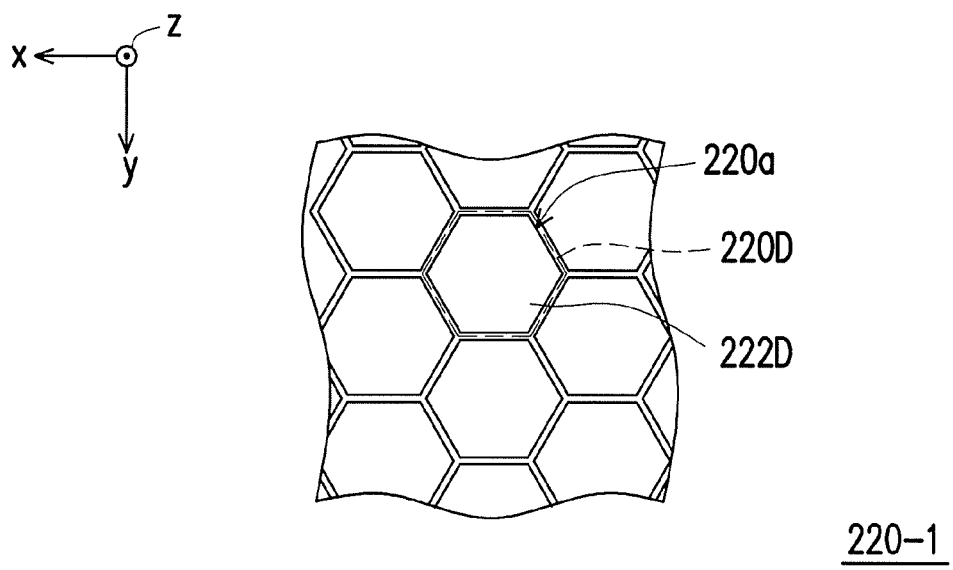
FIG. 14 is a schematic front view illustrating a first lens array according to still another embodiment.

FIG. 14 is a schematic front view illustrating a first lens array according to still another embodiment. Referring to FIG. 14, the first lens array 220-1 has a plurality of micro-lens units 220D arranged into an array. The outline 220a of each of the micro-lens units 220D is polygonal-shaped (e.g., hexagonal, but the disclosure is not limited thereto). Each of the micro-lens units 220D is a single first optical micro-structure 222D having the outline 220a. The first optical micro-structure 222D is solid and does not have a hole inside.

Figure 15:
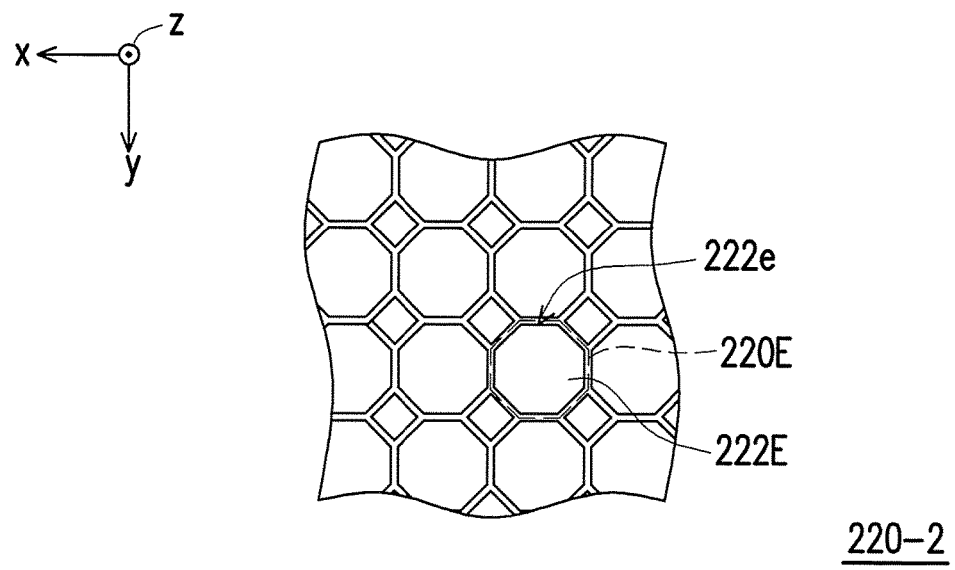
FIG. 15 is a schematic front view illustrating a first lens array according to an embodiment of the disclosure.

FIG. 15 is a schematic front view illustrating a first lens array according to an embodiment of the disclosure. Referring to FIG. 15, the first lens array 220-2 has a plurality of micro-lens units 220E arranged into an array. An outline 220e of each of the micro-lens units 220E is polygonal-shaped (e.g., octagonal, but the disclosure is not limited thereto). Each of the micro-lens units 220E is a single first optical micro-structure 222E having the profile 220e. The first optical micro-structure 222E is solid and does not have a hole inside.

Figure 16:
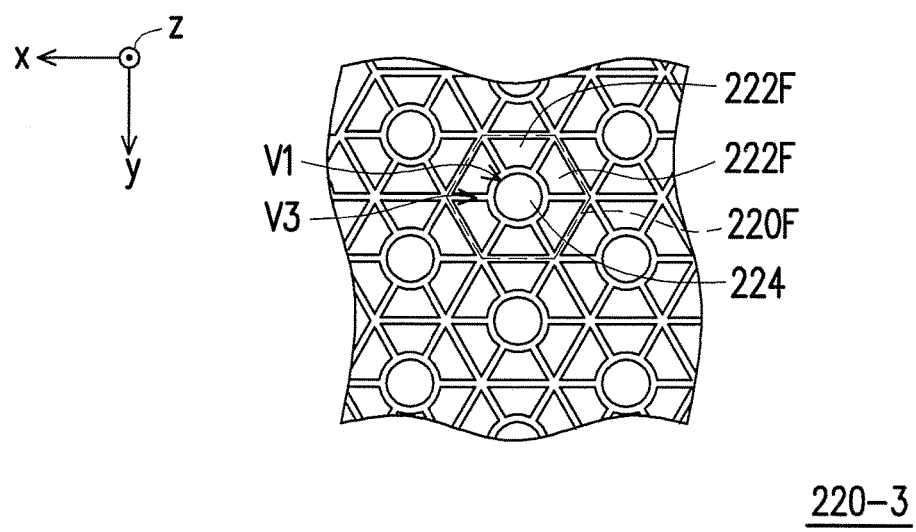
FIG. 16 is a schematic front view illustrating a first lens array according to another embodiment of the disclosure.

FIG. 16 is a schematic front view illustrating a first lens array according to another embodiment of the disclosure. Referring to FIG. 16, a first lens array 220-3 shown in FIG. 16 is similar to the first lens array 220 shown in FIG. 7. Thus, like or corresponding elements are referred to with like or corresponding reference numerals. Similar parts therebetween may be referred to the foregoing description with reference to reference numerals in FIG. 16, and the first lens array 220-3 differs from the first lens array 220 in that first optical micro-structures 222F are a plurality of protrusions surrounding the second optical micro-structure 224 and separated from each other. In other words, in addition to the recess V1 that separates the first optical micro-structures 222F and the second optical micro-structure 224, each of the micro-lens units 220F of the first lens array 220-3 further has a plurality of recesses V3. The recesses V3 extend from the recess V1 and are arranged radially, such that the protrusions of the first optical micro-structures 222F are separated from each other.

Figure 17:
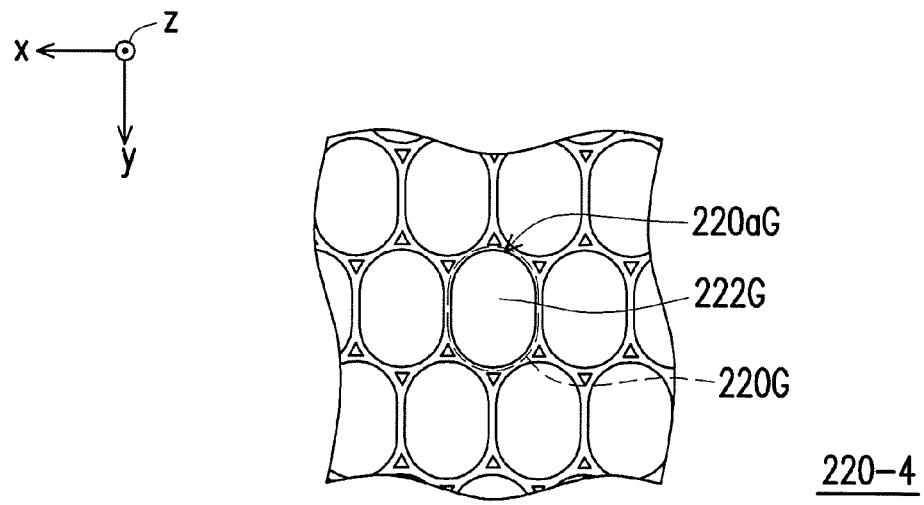
FIG. 17 is a schematic front view illustrating a first lens array according to yet another embodiment of the disclosure.

FIG. 17 is a schematic front view illustrating a first lens array according to yet another embodiment of the disclosure. Referring to FIG. 17, the first lens array 220-4 shown in FIG. 17 has a plurality of micro-lens units 220G arranged into an array. An outline 220aG of each of the micro-lens units 220G is ellipsoidal. Each of the micro-lens units 220G is a single first optical micro-structure 222G. The first optical micro-structure 222G is solid and does not have a hole inside.

Figure 18:
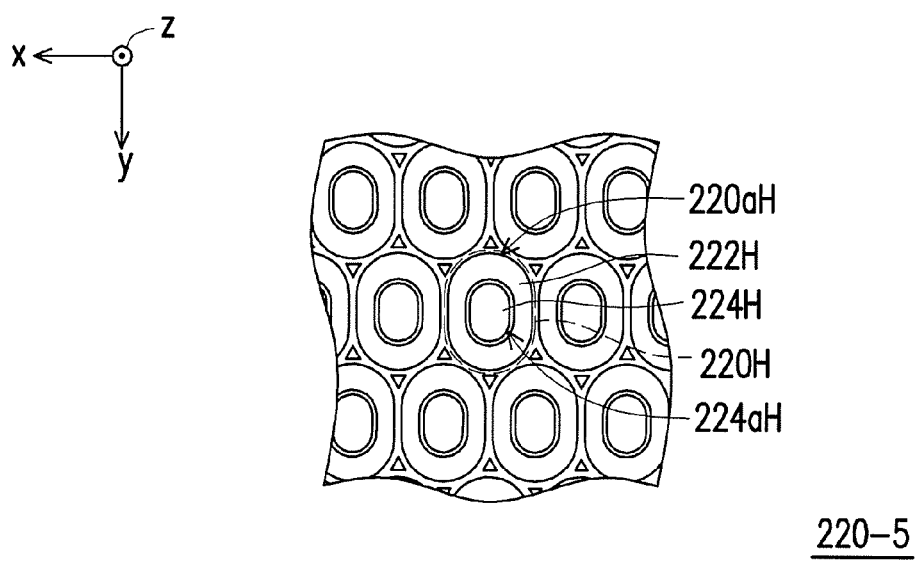
FIG. 18 is a schematic front view illustrating a first lens array according to still another embodiment of the disclosure.

FIG. 18 is a schematic front view illustrating a first lens array according to still another embodiment of the disclosure. Referring to FIG. 18, the first lens array 220-5 shown in FIG. 18 has a plurality of micro-lens units 220H arranged into an array. An outline 220aH of each of the micro-lens units 220H is ellipsoidal. Each of the micro-lens units 220H includes a first optical micro-structure 222H having an ellipsoidal outline 220aH and a second optical micro-structure 224H having an ellipsoidal outline 224aH. The first optical micro-structure 222H surrounds the second optical micro-structure 224H and is connected to the second optical micro-structure 224H. A shape of the outline 224aH of the second optical micro-structure 224H is the same as a shape of the outline 220aH of the first optical micro-structure 222H.

Figure 19:
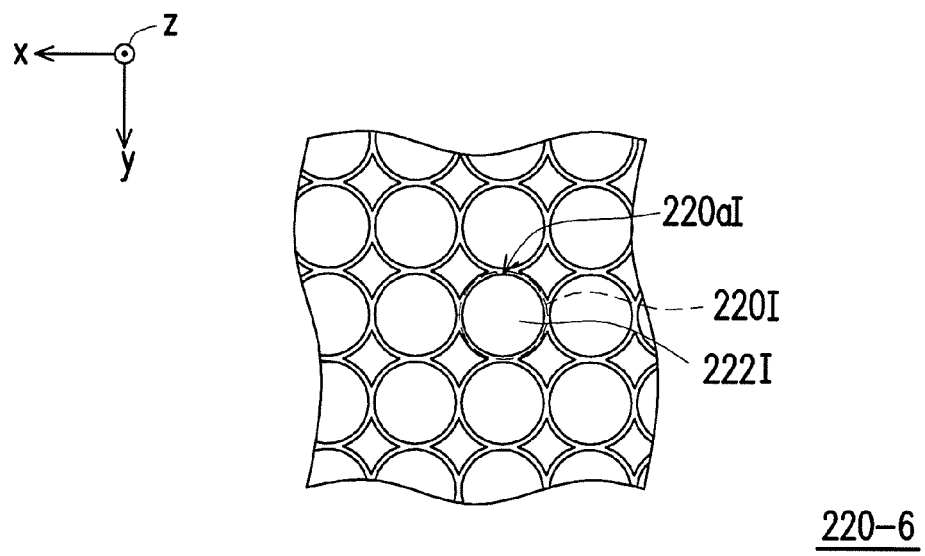
FIG. 19 is a schematic front view illustrating a first lens array according to an embodiment of the disclosure.

FIG. 19 is a schematic front view illustrating a first lens array according to an embodiment of the disclosure. Referring to FIG. 19, the first lens array 220-6 has a plurality of micro-lens units 220I arranged into an array. An outline 220aI of each of the micro-lens units 220I is circular. Each of the micro-lens units 220I is a single first optical micro-structure 222I having a profile 220aI. The first optical micro-structure 222I is solid and has a hole inside.

Figure 20:
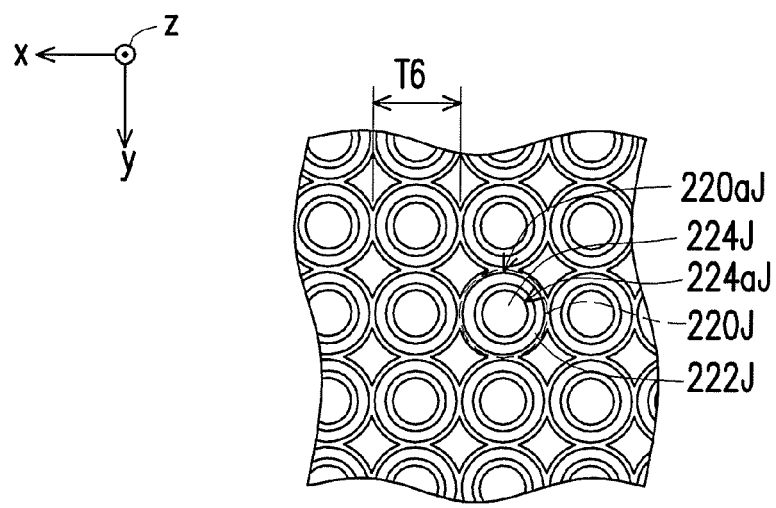
FIG. 20 is a schematic front view illustrating a first lens array according to another embodiment of the disclosure.

FIG. 20 is a schematic front view illustrating a first lens array according to another embodiment of the disclosure. Referring to FIG. 20, a first lens array 220-7 includes a plurality of micro-lens units 220J arranged into an array. In this embodiment, an outline 220aJ of each of the micro-lens units 220J is circular, and a diameter T6 of the outline 220aJ is approximately 150 micrometers, for example. However, the disclosure is not limited thereto. In this embodiment, each of the micro-lens units 220J includes a first optical micro-structure 222J and a second optical micro-structure 224J. The first optical micro-structure 222J has the circular outline 220aJ. The first optical micro-structure 222J surrounds the second optical micro-structure 224J and is connected to the second optical micro-structure 224J. A shape of an outline 224aJ of the second optical micro-structure 224J is the same as a shape of the outline 220aJ of the first optical micro-structure 222J.

Figure 21:
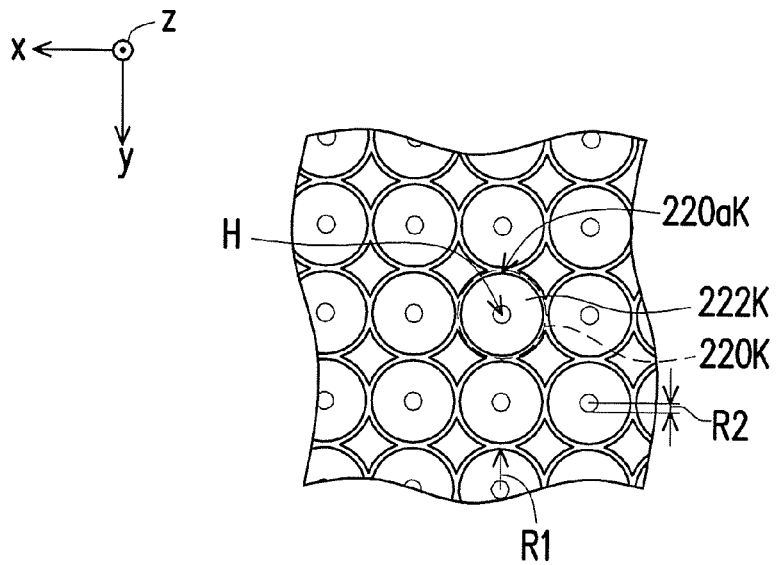
FIG. 21 is a schematic front view illustrating a first lens array according to yet another embodiment of the disclosure.

FIG. 21 is a schematic front view illustrating a first lens array according to yet another embodiment of the disclosure. Referring to FIG. 21, the first lens array 220-8 shown in FIG. 21 has a plurality of micro-lens units 220K arranged into an array. An outline 220aK of each of the micro-lens units 220K is circular. Each of the micro-lens units 220K is a single first optical micro-structure 222K. The first optical micro-structure 222K may have a circular hole H inside. More specifically, the circular hole H may be optionally concentric with the outline 220aK of the micro-lens unit 220K. A ratio between a radius R1 of the outline 220aK of the micro-lens unit 220K and a radius R2 of the circular hole H is greater than or equal to 2. In other words, the micro-lens unit 220K may be in a shape of a doughnut.

Figure 22:
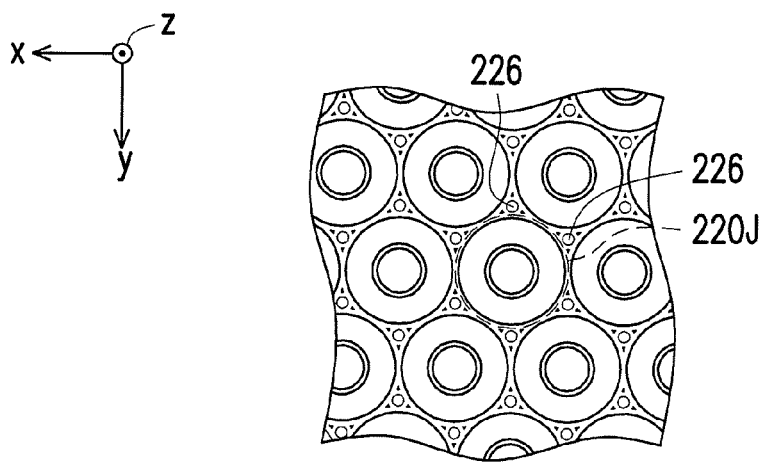
FIG. 22 is a schematic front view illustrating a first lens array according to still another embodiment of the disclosure.

FIG. 22 is a schematic front view illustrating a first lens array according to still another embodiment of the disclosure. Referring to FIG. 22, a first lens array 220-9 shown in FIG. 22 is similar to the first lens array 220-7 of FIG. 20. Thus, like or corresponding elements are referred to with like or corresponding reference numerals. Similar parts therebetween may be referred to the foregoing description with reference to reference numerals in FIG. 21, and the first lens array 220-9 differs from the first lens array 220-7 in that the first lens array 220-9 shown in FIG. 22 further includes sub-micro-lens units 226 in addition to the micro-lens units 220J. An area of each of the sub-micro-lens units 226 is smaller than an area of each of the micro-lens units 220J. The sub-micro-lens units 226 are interspersed between the micro-lens units 220J.

In the embodiment shown in FIG. 22, an outline of each of the sub-micro-lens units 226 may be optionally designed to be circular, and the areas of the micro-lens units 226 may be the same. However, the disclosure is not limited thereto. In other embodiments, the outline of the sub-micro-lens unit 226 may also be designed as other shapes based on the practical needs, and the areas of the sub-micro-lens units 226 may be different from each other. In the embodiment shown in FIG. 22, the sub-micro-lens units 226 may be regularly interspersed between the micro-lens units 220J. However, the disclosure is not limited thereto. In other embodiments, the sub-micro-lens units may also be irregularly interspersed between the micro-lens units. Such configuration is described in the following embodiment.

Figure 23:
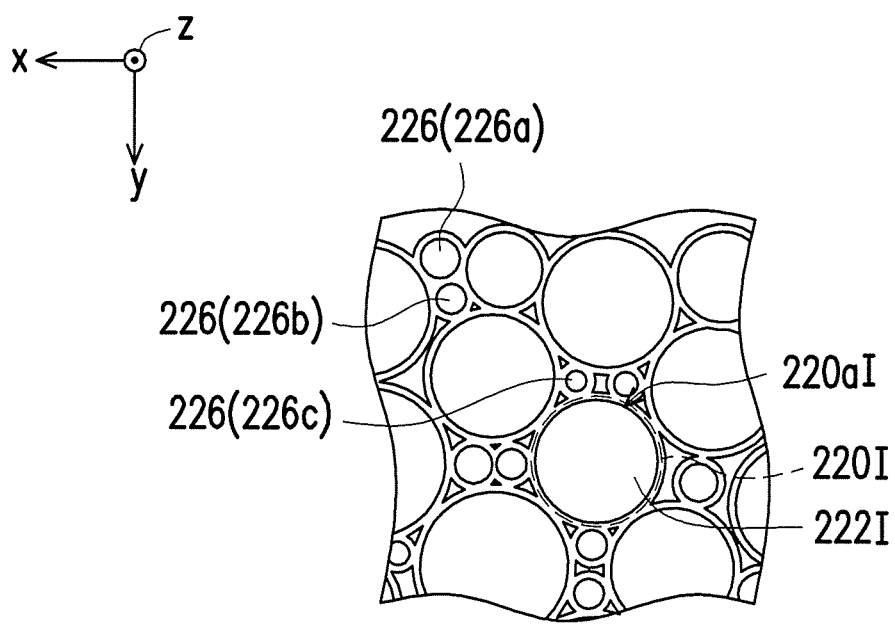
FIG. 23 is a schematic front view illustrating a first lens array according to an embodiment of the disclosure.

FIG. 23 is a schematic front view illustrating a first lens array according to an embodiment of the disclosure. Referring to FIG. 23, a first lens array 220-10 shown in FIG. 23 is similar to the first lens array 220-6 of FIG. 19. Thus, like or corresponding elements are referred to with like or corresponding reference numerals. Similar parts therebetween may be referred to the foregoing description with reference to the reference numerals in FIG. 23, and the first lens array 220-10 differs from the first lens array 220-7 in that the first lens array 220-10 shown in FIG. 23 further includes the sub-micro-lens units 226 in addition to the micro-lens units 220I. The area of each of the sub-micro-lens units 226 is smaller than the area of each of the micro-lens units 220I. The sub-micro-lens units 226 are interspersed between the micro-lens units 220I.

In the embodiment shown in FIG. 23, an outline of each of the sub-micro-lens units 226 may be optionally designed to be circular. However, the disclosure is not limited thereto. In other embodiments, the outline of the sub-micro-lens unit 226 may also be designed as other shapes based on the practical needs. In the embodiment shown in FIG. 23, the sub-micro-lens units 226 may be irregularly interspersed between the micro-lens units 220I. The sub-micro-lens units 226 include a plurality of first sub-micro-lens units 226a, a plurality of second sub-micro-lens units 226b, and a plurality of third sub-micro-lens units 226c. An area of each of the first sub-micro-lens units 226a is greater than an area of each of the second sub-micro-lens units 226b. The area of each of the second sub-micro-lens units 226b is greater than an area of each of the third sub-micro-lens units 226c. The first, second, and third sub-micro-lens units 226a, 226b, and 226c respectively having different areas may be randomly distributed. In this embodiment, a ratio between the area of each of the micro-lens units 220I and an area of the smallest third sub-micro-lens unit 220c may be optionally greater than or equal to 3. However, the disclosure is not limited thereto.

The sub-micro-lens units 226 shown in FIG. 22 or 23 may also be interspersed between the micro-lens units of the first lens arrays 220, 220', 220", and 220-1 to 220-8 shown in FIGS. 7, 11, 13, 14, 15, 16, 17, 18, 19, 20, and 21. The first lens arrays configured in this way also fall within the scope claimed in the disclosure.

In view of the foregoing, the optical device according to the embodiments of the disclosure appropriately diffuse the image beam by adopting the design "the outline of each of the micro-lens units of the first lens array is polygonal-shaped, circular, or ellipsoidal", so as to suppress the speckle noises. Besides, the optical device is disposed in the projection apparatus according to the embodiments of the disclosure as the real image forming device. Thus, the speckle noises of the image beam formed on the real image forming device are reduced. Accordingly, the image quality of the projection apparatus is improved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A projection apparatus, comprising:
   a projection unit, emitting an image beam; and
   a real image forming device, disposed on a transmitting path of the image beam, wherein the image beam forms an image on the real image forming device, and the real image forming device comprises:
      a first lens array, having a plurality of micro-lens units, wherein the micro-lens units are arranged into an array, an outline of each of the micro-lens units is polygonal-shaped, circular, or ellipsoidal, and each of the micro-lens units comprises:
         a first optical micro-structure, having the outline that is polygonal-shaped, circular, or ellipsoidal; and
         a second optical micro-structure, wherein the first optical micro-structure surrounds the second optical micro-structure and is connected to the second optical micro-structure, and a shape of an outline of the second optical micro-structure is the same as or different from a shape of the outline of the first optical micro-structure; and
      a second lens array, disposed beside the first lens array and having a plurality of columnar micro-lenses parallel to each other.

2. The projection apparatus as claimed in claim 1, wherein the first optical micro-structure has the polygonal-shaped outline, the shape of the outline of the second optical micro-structure is different from the shape of the outline of the first optical micro-structure, and the outline of the second optical micro-structure is circular or polygonal-shaped.

3. The projection apparatus as claimed in claim 2, wherein the first and second optical micro-structures protrude toward the same side.

4. The projection apparatus as claimed in claim 1, wherein a normal direction of a reference plane is parallel to an extending direction of each of the columnar micro-lenses, the reference plane takes a section of each of the columnar micro-lenses, a periphery of the section comprises a curved line, and a curvature radius of the curved line of one of the columnar micro-lenses is different from a curvature radius of the curved line of another of the columnar micro-lenses.

5. The projection apparatus as claimed in claim 1, wherein the columnar micro-lenses are arranged along a direction, each of the columnar micro-lenses has a width in the direction, and the width of one of the columnar micro-lenses in the direction is different from the width of another of the columnar micro-lenses in the direction.

6. The projection apparatus as claimed in claim 1, wherein a normal direction of a reference plane is parallel to an extending direction of each of the columnar micro-lenses, the reference plane takes a section of each of the columnar micro-lenses, and a periphery of the section comprises a portion of a curve, a portion of an ellipse, or a portion of a triangle.

7. The projection apparatus as claimed in claim 1, wherein each of the columnar micro-lenses has a convex surface.

8. The projection apparatus as claimed in claim 1, wherein each of the columnar micro-lenses has a first apex, each of the micro-lens unit has a second apex, a distance between the first apex of each of the columnar micro-lenses and the second apex of the corresponding micro-lens unit is D, a focal length of each of the columnar micro-lens is F1, and a focal length of each of the micro-lens units is F2, wherein $F1 \leq D \leq (30 \cdot F1)$, $F2 \leq D \leq (30 \cdot F2)$, or $F1 \leq D \leq (30 \cdot F1)$ and $F2 \leq D \leq (30 \cdot F2)$.

9. The projection apparatus as claimed in claim 1, wherein the real image forming device further comprises:
a third lens array, having a plurality of columnar micro-lenses parallel to each other, wherein the columnar micro-lenses of the second lens array are arranged along a first direction, the columnar micro-lenses of the third lens array are arranged along a second direction, and the first direction and the second direction are not parallel to each other.

10. The projection apparatus as claimed in claim 1, further comprising:
a virtual image forming unit, enlarging the image into a virtual image, wherein the virtual image forming unit comprises:
a concave lens, having a concave surface, wherein the concave surface partially reflects and partially transmits the image.

11. The projection apparatus as claimed in claim 10, wherein a periphery of the virtual image forming unit and a light field distribution of the image are rectangular.

12. The projection apparatus as claimed in claim 1, wherein the image beam is divided into a plurality of sub-image beams carrying different information, the sub-image beams are arranged along a first direction on the projection unit, the image is divided into a plurality of sub-images respectively formed by the sub-image beams, the sub-images are arranged along a second direction on the real image forming device, and the first direction and the second direction are not parallel to each other.

13. The projection apparatus as claimed in claim 1, wherein the first lens array further comprises:
a plurality of sub-micro-lens units, wherein an area of each of the sub-micro-lens units is smaller than an area of each of the micro-lens units, and the sub-micro-lens units are interspersed between the micro-lens units, wherein the outline of each of the sub-micro-lens units is circular.

14. The projection apparatus as claimed in claim 13, wherein the sub-micro-lens units are regularly or irregularly interspersed between the micro-lens units.

15. The projection apparatus as claimed in claim 13, wherein a ratio between an area of each of the micro-lens units and an area of the smallest sub-micro-lens unit of the sub-micro-lens units is greater than or equal to 3.

16. An optical device, comprising:
a first lens array, having a plurality of micro-lens units, wherein the micro-lens units are arranged into an array, an outline of each of the micro-lens units is polygonal-shaped, circular, or ellipsoidal, and each of the micro-lens units comprises:
a first optical micro-structure, having the outline that is polygonal-shaped, circular, or ellipsoidal; and
a second optical micro-structure, wherein the first optical micro-structure surrounds the second optical micro-structure and is connected to the second optical micro-structure, and a shape of an outline of the second optical micro-structure is the same as or different from a shape of the outline of the first optical micro-structure; and
a second lens array, disposed beside the first lens array and having a plurality of columnar micro-lenses parallel to each other.

17. The optical device as claimed in claim 16, wherein the first optical micro-structure has the polygonal-shaped outline, the shape of the outline of the second optical micro-structure is different from the shape of the outline of the first optical micro-structure, and the outline of the second optical micro-structure is circular or polygonal-shaped.

18. The optical device as claimed in claim 16, further comprising:
a third lens array, having a plurality of columnar micro-lenses parallel to each other, wherein the columnar micro-lenses of the second lens array are arranged along a first direction, the columnar micro-lenses of the third lens array are arranged along a second direction, and the first direction and the second direction are not parallel to each other.

19. The optical device as claimed in claim 16, wherein the first lens array further comprises:
a plurality of sub-micro-lens units, wherein an area of each of the sub-micro-lens units is smaller than an area of each of the micro-lens units, and the sub-micro-lens units are interspersed between the micro-lens units.

20. A projection apparatus, comprising:
a projection unit, emitting an image beam; and
a real image forming device, disposed on a transmitting path of the image beam, wherein the image beam forms an image on the real image forming device, and the real image forming device comprises:
a first lens array, having a plurality of micro-lens units, wherein the micro-lens units are arranged into an array, an outline of each of the micro-lens units is circular, and there is a circular hole inside each of the micro-lens units.

21. A projection apparatus, comprising:
a projection unit, emitting an image beam; and
a real image forming device, disposed on a transmitting path of the image beam, wherein the image beam forms an image on the real image forming device, and the real image forming device comprises:
a first lens array, having a plurality of micro-lens units, wherein the micro-lens units are arranged into an array, and an outline of each of the micro-lens units is polygonal-shaped, circular, or ellipsoidal; and
a second lens array, disposed beside the first lens array and having a plurality of columnar lenses parallel to each other.

22. The projection apparatus as claimed in claim 21, wherein the real image forming device further comprises:
a third lens array, having a plurality of columnar micro-lenses parallel to each other, wherein the columnar micro-lenses of the second lens array are arranged along a first direction, the columnar micro-lenses of the third lens array are arranged along a second direction, and the first direction and the second direction are not parallel to each other.

* * * * *